(No Model.)
B. BLOOD
Reaper.
No. 233,468. Patented Oct. 19, 1880.
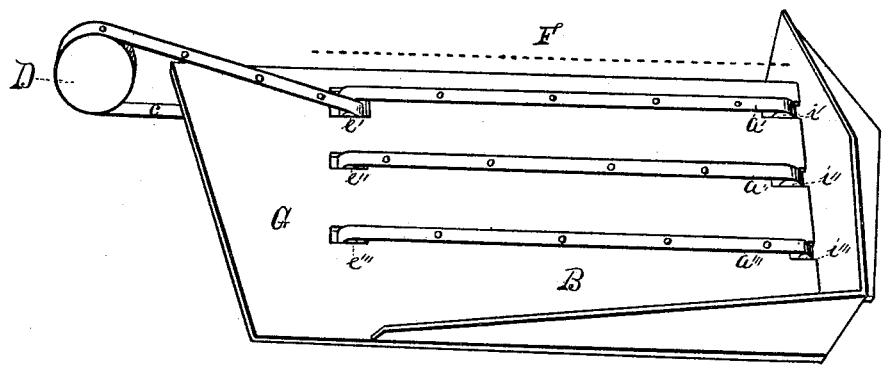
Witnesses:
H. A. Blood,
John Paul Blood.
Inventor:
Benj. Blood.

UNITED STATES PATENT OFFICE.

BENJAMIN BLOOD, OF AMSTERDAM, NEW YORK.

REAPER.

SPECIFICATION forming part of Letters Patent No. 233,468, dated October 19, 1880.

Application filed September 10, 1880. (No model.)

*To all whom it may concern:*

Be it known that I, BENJAMIN BLOOD, of Amsterdam, in the county of Montgomery and State of New York, have invented a new and useful Improvement in Reapers, of which the following is a specification.

My invention is a swathing attachment to a mowing or reaping machine, and takes power therefrom.

The drawing herewith, as part hereof, shows a rear view of my device in perspective. The dotted line F marks the position and relative extent of the cutting apparatus.

B is the platform, attached and sustained as usual, slotted for the passage of the belts $a'$ $a''$ $a'''$, and exceeding the working length of the belts on the inner end by about two feet. These belts are endless, glide along the upper surface of the platform, pass through the slots down around the pulleys $e'$ $e''$ $e'''$, and return up around the pulleys $i'$ $i''$ $i'''$, all of which are about flush with the upper surface of the platform.

The belt $c$, running around the wheel D, may communicate power to the other belts, or receive motion from them, its special use in any case being to carry the butts of the fallen grain inward and over the range of the balance-wheel and pitman of the sickle, which must also be shielded from loose straws, &c. The belts, as they run under the platform, must also be shielded from stubble, stones, &c.

The device operates as follows: As the grain falls upon the platform the belts $a'$ $a''$ $a'''$ urge it inward, delivering the heads upon the extension (marked G) of the platform, and the butts simultaneously on the belt $c$. Resting upon the space G, free from the direct action of the belts $a'$ $a''$ $a'''$, and there protected as yet from the stubble, the heads pause from their lateral motion, while the butts pass over the wheel D, and so on to the stubble of the previous swath. As the reaper advances, the heads are carried forward only far enough to leave the stalks lying on the stubble perpendicular to the path of the machine in a swath reversed, as compared with that of the ordinary cradle.

Where straw-carrying belts have been used on harvesters heretofore, they have delivered the grain either directly on the stubble or on a sloping and rear-elevated attachment to the platform proper, (when a swath was required,) designed to sway the heads away from the standing grain, while the butts were comparatively pivotal into the ordinary cradle-swath. The belts, as I use them, deliver the heads upon an extension of the platform direct and uniform, making the heads pivotal thereon, and reversing the position of the swath.

What I claim as novel in my device is—

The combination, with the wheel D and belt $c$, of the platform B, and the belts $a'$ $a''$ $a'''$, whereby the extension of the uniform surface of the platform affords a place of delivery for the heads of grain, protected alike from the direct action of those belts and of the stubble beneath, for the purpose set forth.

BENJ. BLOOD.

Witnesses:
MARTIN DROVER,
WALTER L. VAN DENBIGH.